United States Patent [19]

Richardson

[11] Patent Number: 4,501,950
[45] Date of Patent: Feb. 26, 1985

[54] ADAPTIVE WELDING SYSTEM

[75] Inventor: Richard W. Richardson, Columbus, Ohio

[73] Assignee: Caterpillar Tractor Co., Peoria, Ill.

[21] Appl. No.: 432,888

[22] PCT Filed: Sep. 7, 1982

[86] PCT No.: PCT/US82/01235
§ 371 Date: Sep. 7, 1982
§ 102(e) Date: Sep. 7, 1982

[87] PCT Pub. No.: WO84/00913
PCT Pub. Date: Mar. 15, 1984

[51] Int. Cl.³ .............................................. B23K 9/12
[52] U.S. Cl. .............................. 219/124.34; 250/202; 318/577
[58] Field of Search ............... 219/124.34, 124.22; 318/577; 250/202

[56] References Cited

U.S. PATENT DOCUMENTS

| | | | |
|---|---|---|---|
| 2,454,959 | 11/1948 | Barnes | 88/14 |
| 3,135,857 | 6/1964 | Von Voros | 219/124.34 |
| 3,757,125 | 9/1973 | Okada et al. | 250/202 |
| 3,775,581 | 11/1973 | Sciaky | 219/121 EM |
| 3,924,094 | 12/1975 | Hansen et al. | 219/124.34 |
| 3,924,095 | 12/1975 | Hansen et al. | 219/125 PL |
| 3,977,793 | 8/1976 | Trotta | 356/218 |
| 3,993,889 | 11/1976 | Sciaky | 235/151.1 |
| 4,021,840 | 5/1977 | Ellsworth et al. | 358/101 |
| 4,225,771 | 9/1980 | Justice et al. | 219/137 R |
| 4,396,832 | 8/1983 | Henderson | 318/577 |
| 4,417,127 | 11/1983 | Nachev et al. | 250/202 |

FOREIGN PATENT DOCUMENTS 55-84275  6/1980  Japan .............................. 219/124.34

OTHER PUBLICATIONS

National Aeronautics & Space Administration-NASA Tech Brief, vol. 2, No. 4, Item 24, from JPL Invention Report 30-3809/NPO-14066, NASA Patent Specification-Multi-Channel Rotating Optical Interface for Data Transmission-77/101.
Publication from the Oct. 29, 1981 Edition of the Engineer Magazine.
Publication from the Sep., 1981 Edition of Product Engineering Magazine.
Publication from the Sep., 1981 Edition of Welding Design & Fabrication Magazine.

Primary Examiner—Clifford C. Shaw
Attorney, Agent, or Firm—Steven L. Noe

[57] ABSTRACT

The performance of prior automated welding systems has been limited by their inability to independently track and weld and by their inability to accurately determine the groove profile. The adaptive welding system disclosed herein includes a weld torch (20) adapted to be controllably positioned in at least two dimensions, and means (28,38) for tracking a workpiece seam (12) to be welded. The tracking means (28,38) is pivotably connected to the weld torch (20). Means (19,40) for pivoting the tracking means (28,38) relative to the weld torch (20) is included to permit both the tracking means (28,38) and the weld torch (20) to be independently maintained over the seam (12). The tracking means (28,38) monitors the seam (12) by optical triangulation of a rotating laser beam (60) projected against the workpieces. This rotating laser beam (60) crosses the seam twice during each cycle of the beam (60).

33 Claims, 10 Drawing Figures

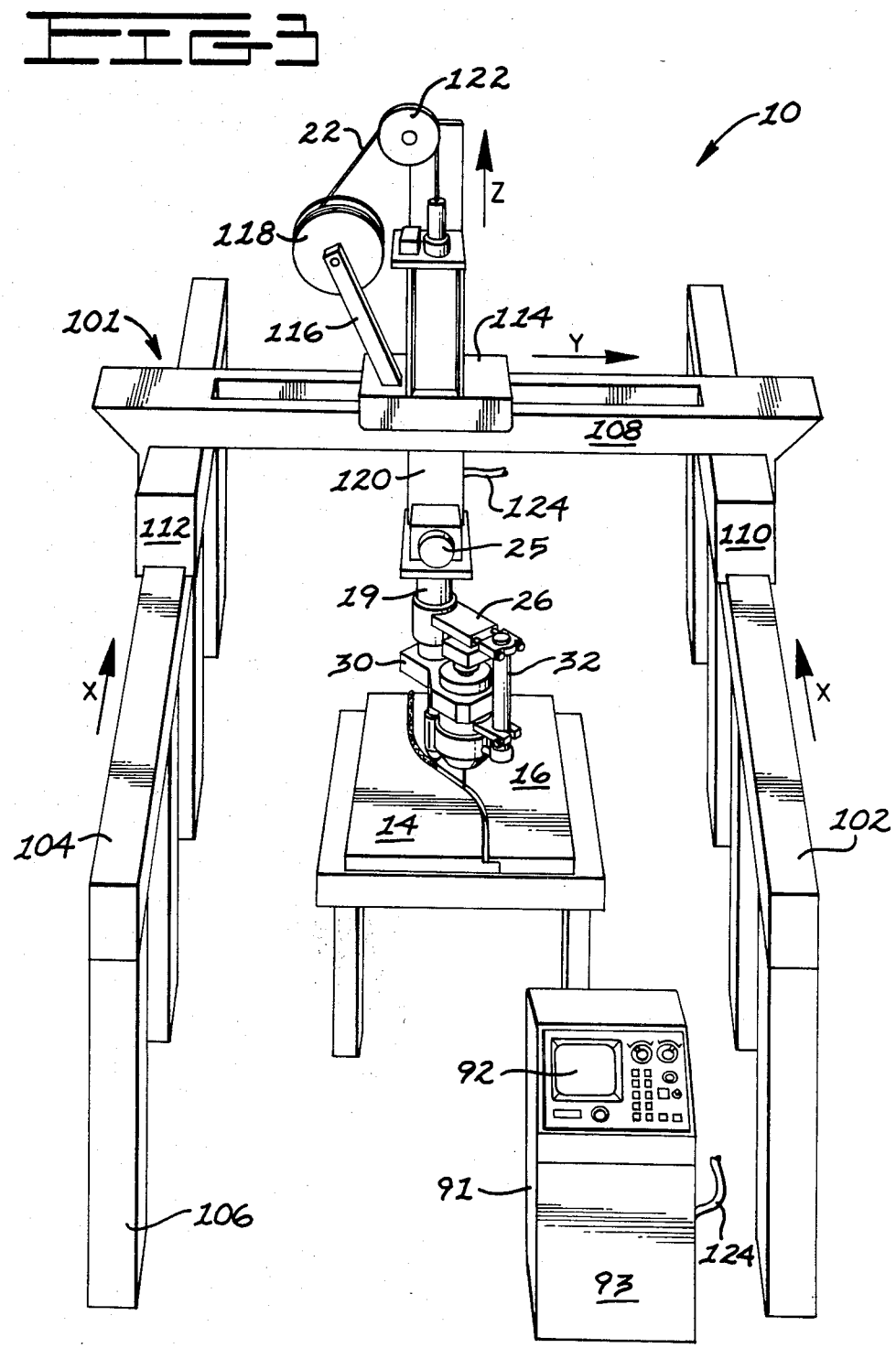

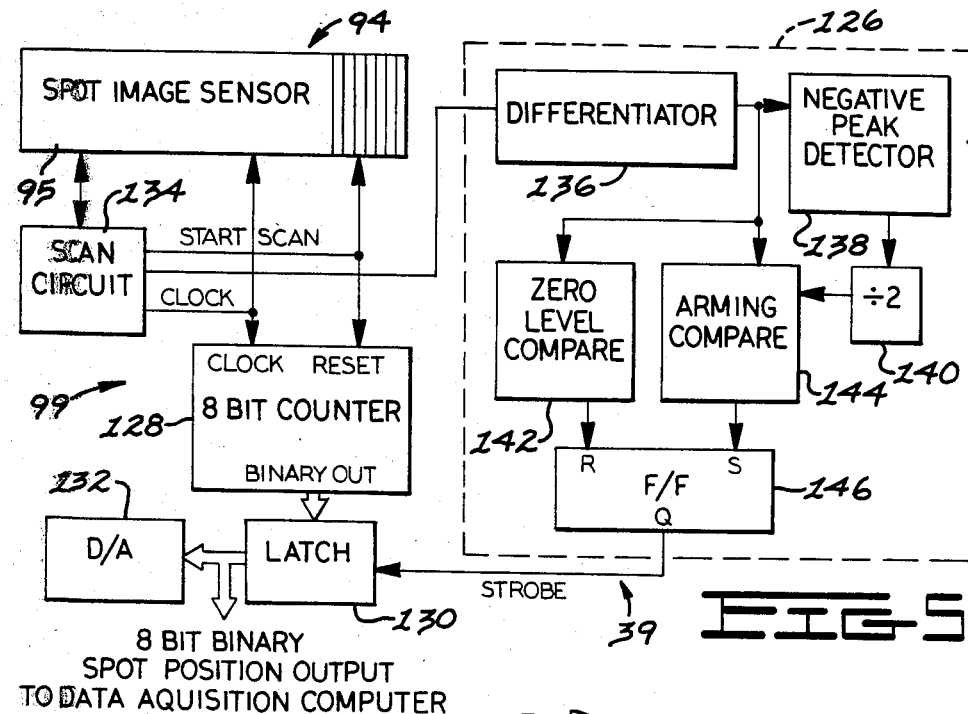
FIG-5
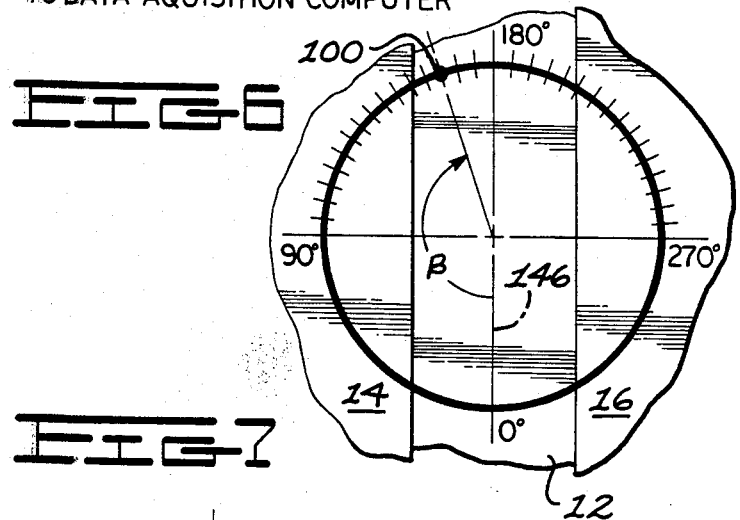
FIG-6
FIG-7
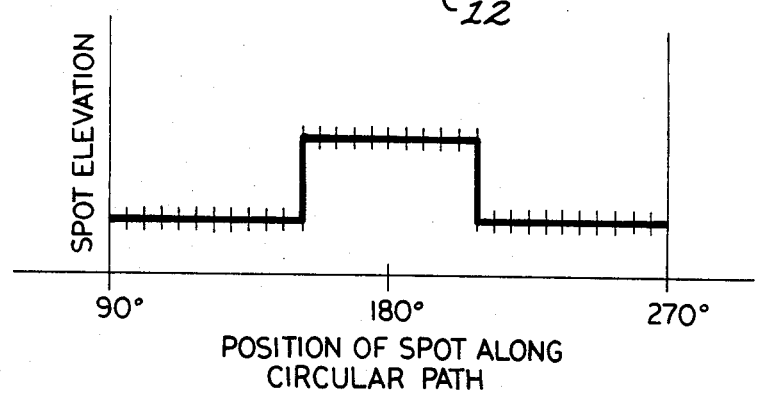

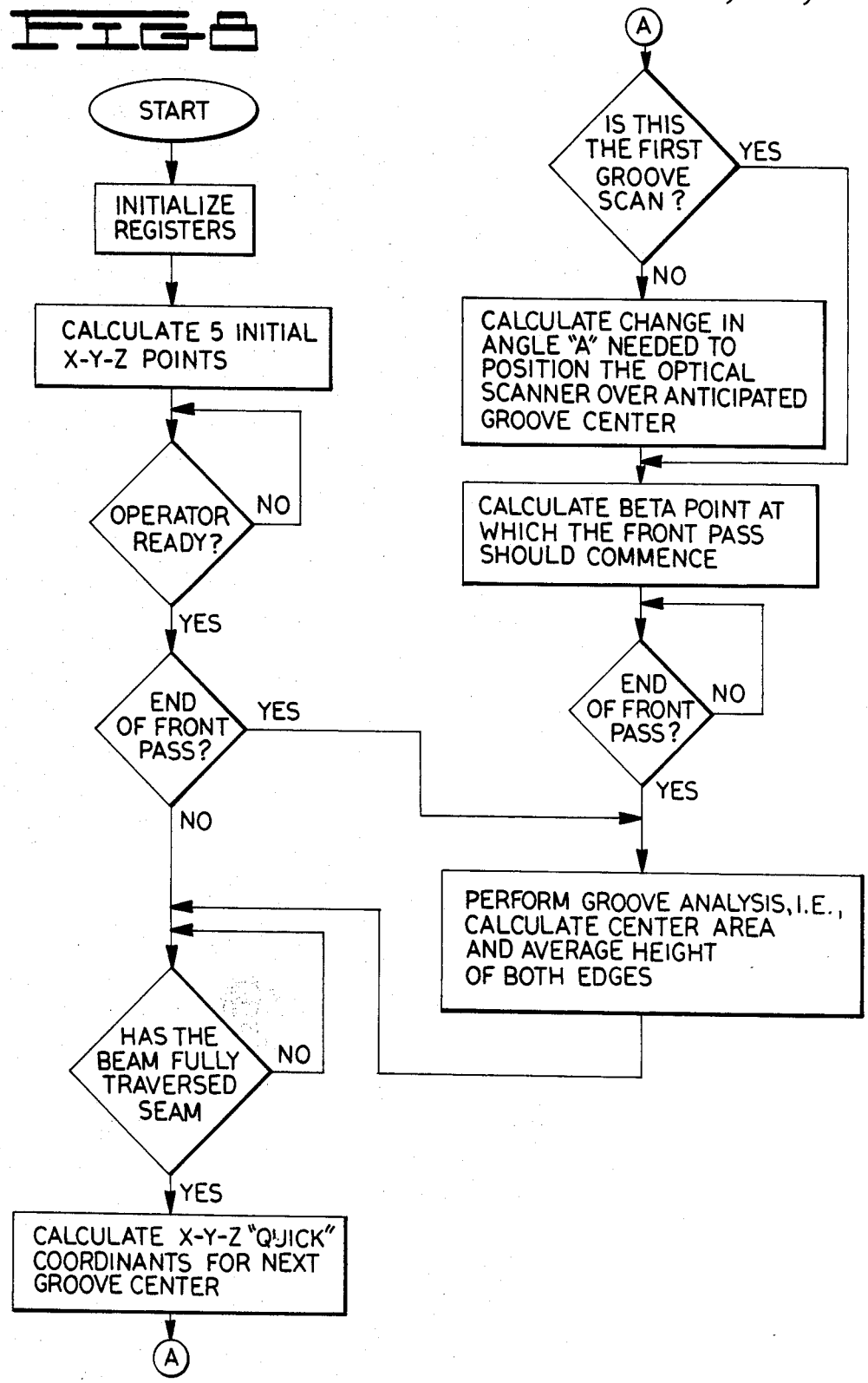

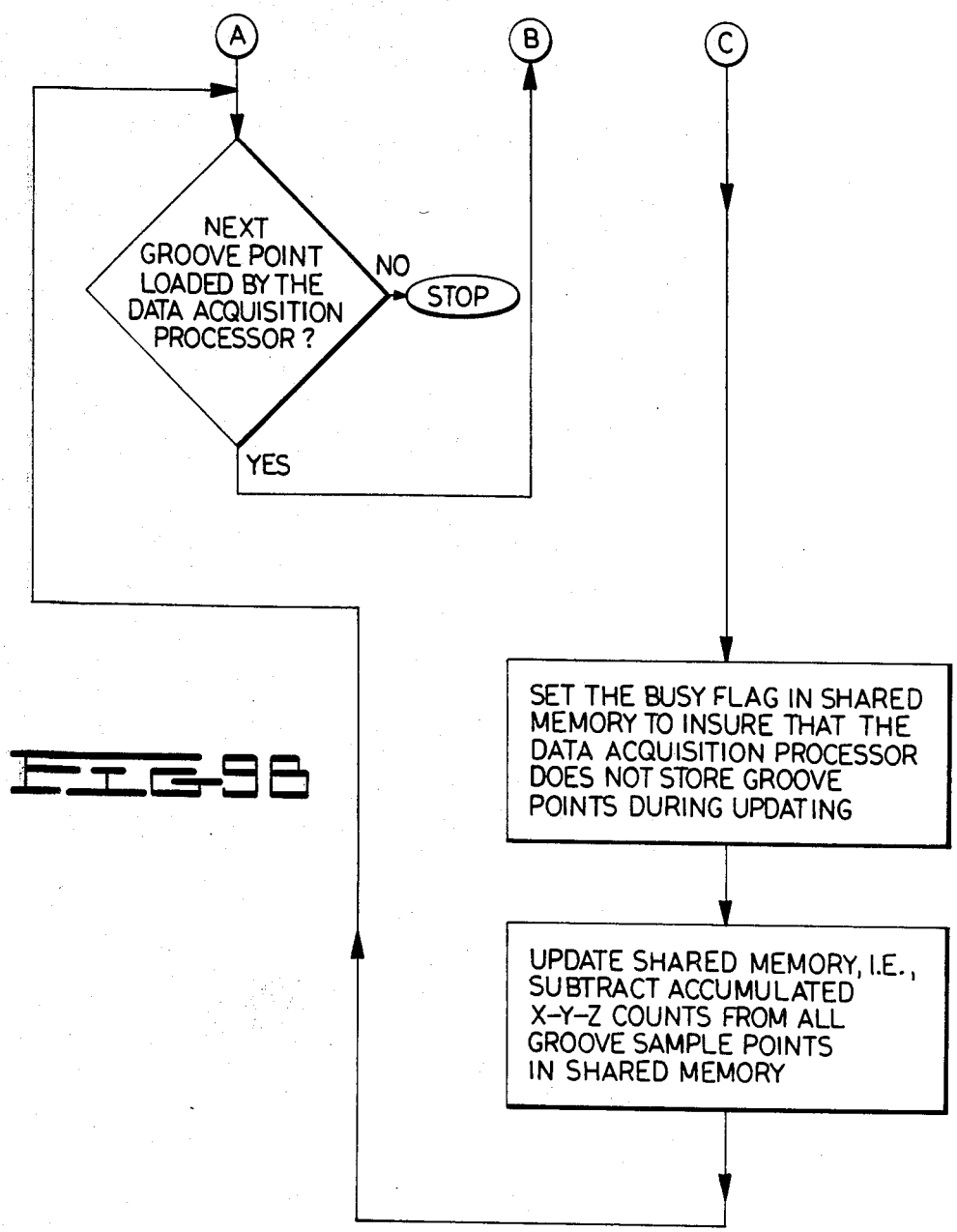

ADAPTIVE WELDING SYSTEM

DESCRIPTION

1. Technical Field

This invention relates generally to automated welding apparatus and more particularly to an improved optical seam sensor for use in a system adapted both for tracking a seam to be welded and for deriving information regarding the configuration of the seam.

2. Background Art

The desirability of removing the human operator from the immediate vicinity of a welding operation is widely recognized throughout industry. Accordingly, extensive and well publicized efforts have been made over the past decade to develop suitable machines capable of automatically manipulating a weld torch relative to a seam or groove to be welded. Presently available automated welding systems are insufficiently precise in their positioning of the weld torch and in their ability to deposit an optimum amount of weld material. This has limited the use of most currently available automated welding systems to spot welding and to distributed weld applications wherein the workpieces can be precisely fixtured to ensure accurate positioning and uniformity of the weld bead.

Additional efforts have been made to apply automatic guidance and control techniques to distributed weld situations; see for example, U.S. Pat. No. 3,924,094 for "Welding Control Arrangement with Orbital Torch-Mounted Transducing Assembly" which issued to Howard A. Hansen et al. on Dec. 2, 1975. While the mechanical weld-seam sensor developed by Hansen et al. has proved satisfactory for many applications, there exists a continuing need both for improved seam tracking capability, such as the ability to perceive and follow right angle turns, and for improved capability to analyze varying seam configurations, such as vertical and non-vertical seam walls and small variations in seam width and depth.

Substitutes for mechanical sensors typically incorporate optical recognition systems, scanning electron beams, eddy current establishing and monitoring systems, and the like. Many optical sensors proposed heretofore have encountered difficulty in welding applications owing to the intense glare from the welding operation tending to swamp the optical signal that is used for tracking purposes. In addition, existing optical tracking systems are typically dependent upon variations in the intensity of the received signal. Scale and surface irregularities can greatly affect the intensity of the reflection and hence create a noise factor and numerous difficulties. One such optical intensity-type system is shown in U.S. Pat. No. 3,757,125 for "Optical Tracking Apparatus" which issued to Okada et al. on Sept. 4, 1973.

An electron beam scanner utilizing a rotating scan path is disclosed in U.S. Pat. No. 3,775,581 for "Seam Tracking Method" which issued to Albert M. Sciaky on Nov. 27, 1973. In this system, a scanning electron beam is caused to rotate in a circular pattern about the seam to be tracked. Reflected and secondary emission electrons are collected by a nearby sensor. A sharp change in the number of observed reflected and secondary emission electrons occurs when the electron beam contacts the boundary of the seam. The points at which these sharp drops in the received signal are detected indicate the position of the seam relative to the center of the scan circle. A situation in which the center of the scan circle is offset relative to the center of the seam results in an unbalanced radian interval between the several sharp changes in signal intensity. The Sciaky system is effectively an intensity-dependent system, and, in common with the optical intensity dependent systems, lacks the ability to derive accurate information regarding physical characteristics of the seam, such as depth and wall configuration. Further, the sensing apparatus and weld torch utilized by Sciaky appear to be of fixed orientation relative to one another. This creates difficulties in following complex seam configurations.

The present invention is directed to overcoming one or more of the problems as set forth above.

DISCLOSURE OF THE INVENTION

In one aspect of the present invention, a welding system has a weld torch, a weld torch support assembly, and means for tracking a weld path along a workpiece to which weld material is to be applied. The tracking means is pivotably attached to the weld torch support assembly. Means is provided for projecting a beam of light against the workpiece and for moving the beam of light about an optical scanning axis. Also provided is means for receiving reflections of said light beam from said workpiece and for determining, as a function of light beam position, the elevation of that portion of the workpiece to which the light beam is instantaneously incident. Means is included for pivoting the tracking means relative to the weld torch in response to variations in the weld path orientation.

In accordance with another aspect of the invention, a novel method for sensing a seam in a workpiece is provided. This method comprises the steps of projecting a beam of light along a first reference axis to a point of incidence on the workpiece, moving the spot through a closed loop path across the seam, receiving the reflected image of the spot along a second reference axis angularly displaced from the first reference axis, producing an electrical signal representing the distance between the optical scanning sensor and the point of incidence of the light beam on the workpiece at a plurality of locations along the path, and rotating the seam sensor relative to the weld torch to maintain both the weld torch and the seam sensor properly positioned directly above the seam. Thus, the elevation of the workpiece at each of a locus of points defining a closed loop is known.

The optical seam sensor set forth herein is adapted for use in combination with automated welding systems. The optical seam sensor has the capability of locating, tracking and analyzing the configuration of the weld seam while avoiding many of the undesirable aspects of prior art optical scanners, such as failure to accommodate sharp corners, loss of signal due to glare from the welding area, and dependency on reflected signal intensity to detect the weld seam. These advantages are achieved through the use of: a source of substantially non-diverging monochromatic light; projection means associated with the light source for directing a discrete reciprocating spot of light onto the workpiece; means for receiving and optically correcting for reciprocation reflections from the spot, the receiving means receiving reflections at a plurality of locations along a substantially closed loop path intersecting the weld seam; and, a separate control for allowing the optical seam sensor to be positioned independently of the weld torch. The system utilizes the principles of optical triangulation for the purpose of establishing the profile of the seam area. The receiver includes means for developing an electronic signal representing the instantaneous distance between the optical seam sensor and the point of incidence of the light beam on the workpiece.

BRIEF DESCRIPTION OF THE DRAWINGS

For a better understanding of the present invention, reference may be had to the accompanying drawings in which:

FIG. 3 is a perspective view of a Cartesian coordinate tracking system utilized in conjunction with the apparatus shown in FIG. 1, in this view the separation between the workpiece and the optical scanning sensor has been somewhat exaggerated for the purpose of clarity;

FIG. 4 is a simplified diagrammatic illustration of a light beam projection means which forms a portion of the apparatus shown in FIGS. 1-3;

FIG. 5 is a simplified block diagram of a circuit for analyzing the image data content of a photocell array utilized in the embodiment of FIGS. 1-4 and for generating therefrom an output representative of the seam configuration;

FIG. 6 is a diagrammatic view of the beta positions at which the spot is monitored on a scan pattern transversing a seam;

FIG. 7 is a graphical representation of data concerning the seam depth as a function of spot position corresponding to FIG. 6, this data would be yielded by the apparatus of FIG. 5 acting in conjunction with the seam configuration analysis computer;

FIG. 8 is a computer program flow chart utilized in the seam configuration analysis computer; and, FIGS. 9a and 9b, taken together, form a computer program flow chart for controlling the movement of the weld torch relative to the seam.

It is to be understood that the drawings are not intended as a definition of the invention but are provided only for the purpose of illustrating a preferred embodiment of the present invention.

BEST MODE FOR CARRYING OUT THE INVENTION

Figure 1:
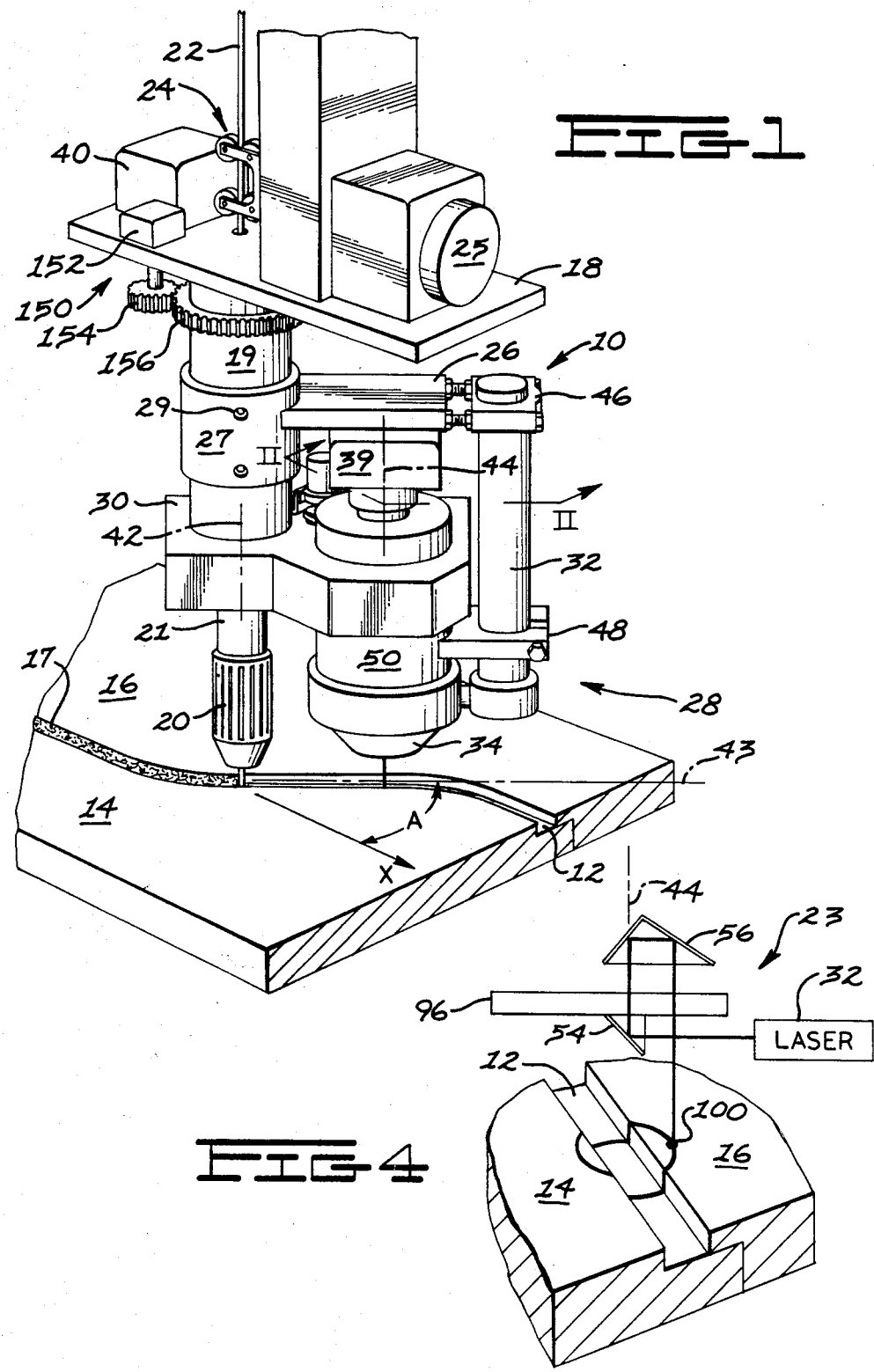
FIG. 1 is a perspective view of an automated welding system embodying a preferred embodiment of the present invention.

Referring to FIG. 1, a preferred embodiment of a seam tracking and welding assembly 10 for tracking and filling a seam 12 is shown. The weld seam 12 is defined by the junction between two abutting or overlapping workpieces 14 and 16, the upper surfaces of which may or may not lie in a common plane. This junction could define a groove, as shown in FIG. 1, or a right angle, or could assume numerous other configurations as will be recognized by those skilled in the art. More generally, the area to which weld material is to be applied will, in the claims, be referred to as "the weld path (12)", but, in the interest of brevity, will presently be referred to as the "seam".

The seam tracking and welding assembly 10 preferably includes a weld torch 20, which, in the preferred embodiment, is adapted for flux cored arc welding (FCAW). The weld torch 20 is suspended in spaced relationship above the workpieces 14 and 16 by an elongated weld torch support 21 which is secured to and depends downwardly from a rigid support platform 18. The weld torch 20 is operative to deposit weld material 17 in the seam 12 at an adjustable controlled rate. Weld wire 22, which can be either solid or flux core, is supplied from a supply reel 118 (see FIG. 3) to the weld torch 20 through a roller feed assembly 24 which is driven by a wire feed motor 25.

A cylindrical sensor rotation sleeve 19 surrounds the weld torch support 21 and has the upper end thereof journalled to the support platform 18 for rotation relative thereto. Secured to and extending radially from the rotation sleeve 19, at a position below the support platform 18, is a mounting plate 26 supporting a low power gas laser 32. Preferably, the mounting plate 26 is attached to the rotation sleeve 19 through an adjustment sleeve 27 to which the mounting plate 26 is fixedly attached. Set screws 29 pass through the adjustment sleeve 27 and allow it to be adjustably fixed to the sensor rotation sleeve 19. In conjunction with an optical system to be detailed below, this laser 32 serves to project a beam 60 of nondiverging monochromatic light onto the workpieces 14 and 16 to establish a spot 100 of light thereupon (FIG. 4).

The terms "light" and "optical" as used herein in reference to the optical portions of the seam tracking and welding assembly 10 are intended to refer not only to electromagnetic radiation of those wavelengths to which the human eye is sensitive, but also to suitable non-visible wavelengths. For example, as will be recognized by those skilled in the optical arts, light of certain wavelengths in the infrared and ultraviolet bands of the spectrum could be utilized.

Figure 2:
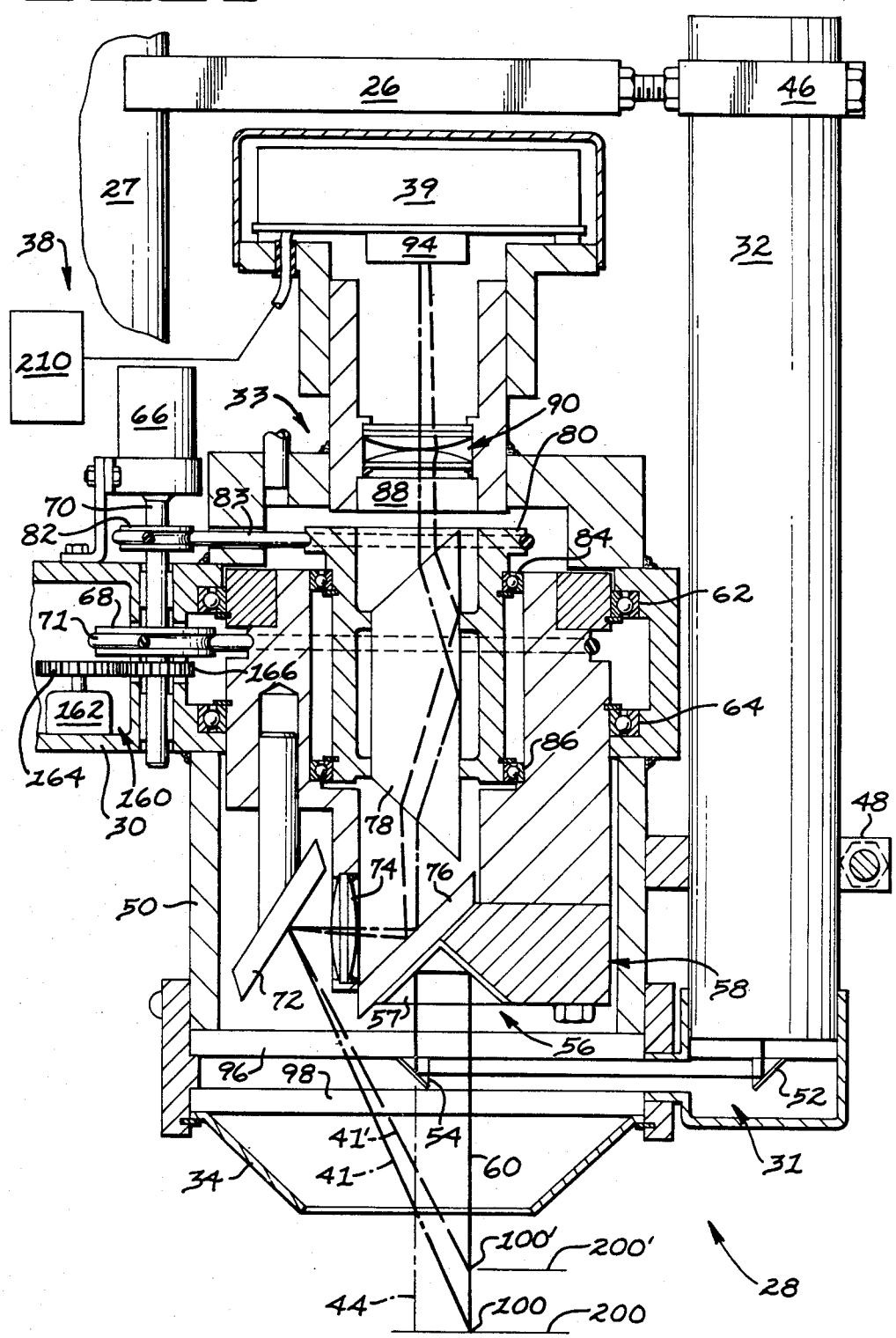
FIG. 2 is a side sectional view, partially in cross-section, taken along line II—II of FIG. 1 showing the optical scanning assembly which forms a portion of the automated welding system of FIG. 1.

As best shown in FIG. 2, the laser 32 forms a portion of an optical scanning assembly 28. This assembly 28 serves to direct the laser beam 60 against the workpieces 14 and 16, rotate the beam 60 in a closed loop, and form a substantially focused image of the reflections from the spot 100. Also provided is means 38 for sensing and analyzing the focused image from the laser spot 100 for developing data regarding the location and configuration of the weld seam 12 and controlling the position of the optical scanning assembly 28 in response thereto. For the purpose of performing the computational analysis of the scan 12 and providing data utilized in the control of the optical scanning assembly 28, the sensing, analyzing and controlling means 38 includes a data acquisition computer 210 which preferably is microprocessor based. Together, the optical scanning assembly 28 and the sensing, analyzing and controlling means 38 form means 28,38 for tracking and analyzing the weld seam 12.

The optical scanning assembly 28 includes a cylindrical optics housing 50 mounted on a bracket 30 which is fixedly cantilevered to the rotation sleeve 19. The rigid affixation of the bracket 30 to both the sensor rotation sleeve 19 and to the optical scanning assembly 28 fixes the position of an optical scanning assembly central projection axis 44 relative to a weld torch axis 42. The weld torch axis 42 is defined as that axis extending from the point being welded to the weld torch 20. In the present embodiment, the weld torch 20, the weld torch support 21, and the rotation sleeve 19 are aligned symmetrically along the weld torch axis 42, which extends vertically. The central projection axis 44 is defined as that axis about which motion of the laser beam 60, as will be detailed subsequently, occurs. In the preferred embodiment, these axes 42 and 44 are parallel and spaced apart a distance of about 10 cm.

The mounting bracket 30 and hence the rotation sleeve 19 each bear the entire weight of the scanning assembly 28. In the preferred embodiment, it is quite important that the two axes 42 and 44 be maintained in precisely parallel orientation. Hence, rigidity of the rotation sleeve 19 and bracket 30 and precise journalling of the rotation sleeve 19 on the weld torch support 21 should be maintained for preventing misalignment of the optical scanning assembly 28.

Referring particularly to FIG. 2, the optical scanning assembly 28 includes a light beam projection means 31 positioned at the lower end of the housing 50. The projection means 31 serves to project the laser beam 60 toward the workpiece 14,16 in a direction parallel to the central projection axis 44. As will be detailed subsequently, the projection means 31 further serves to cause the projected beam 60 to rotate about the central projection axis 44 while maintaining the beam 60 parallel to this axis 44.

The scanning assembly 28 is generally symmetrically disposed about the central projection axis 44 and operates through the laser beam projection means 31 for directing a light spot 100 from the laser 32 onto the upper surface of the workpieces 14 and 16 in the area of the seam 12. The scanning assembly 28 further includes means 33 for receiving and focusing reflections from the light spot 100. The reception of a spot rather than a line of light is advantageous in the present embodiment. This is due to the relatively high intensity of the concentrated spot providing a greater signal-to-noise ratio than would be the case were the receiving and focusing means 33 received reflections from an entire line of light across the workpieces 14,16. This is especially important in welding applications where a large amount of background light occurs proximate the light receiving and focusing means 33.

A photosensitive image sensing device 39, which is adapted for providing data regarding the position of the focused image of the spot 100, is disposed at the top of the scanning assembly 28. The image sensing device 39 forms a portion of the sensing, analyzing and controlling means 38, detailed hereafter, and serves to develop a signal from which the data acquisition computer 210 can derive the location and configuration of the seam 12. This information is gleaned from reflections of the laser beam 60 from the workpieces 12 and 14 utilizing the principles of triangulation, as more fully detailed below.

Adverting back to FIG. 1, the bracket 30 and the mounting plate 26 are rigidly affixed to the rotation sleeve 19 and consequently are rotatable therewith about the weld torch axis 42 so that the position, but not the orientation of the central projection axis 44 relative to the weld torch axis 42, can be altered in a plane perpendicular to the weld torch axis 42. In the embodiment shown in FIG. 3, this plane is the horizontal X-Y plane which also contains the upper surfaces of the workpieces 14 and 16. This alteration of the relative position of the central projection axis 44 is effected without altering either the position or orientation of the weld torch axis 42. Rotation of the rotation sleeve 19, and thus of bracket 30, the support plate 26, and the optical scanning assembly 28 about the weld torch axis 42, is produced by a selectively controllable stepper motor 40 which is mounted on the support platform 18. This pivotability about the weld torch axis 42 provides the optical scanning assembly 28 with a fourth degree of motion hereinafter referred to as "wrist motion". As will be detailed subsequently, apparatus 150 is provided for monitoring the position of the optical scanning assembly 28 relative to the weld torch axis 42.

Attention is again directed to FIG. 2 which shows in detail the interior structure of the optical scanning assembly 28 and the position of the photosensitive image sensing device 39 relative to the scanning assembly 28. The laser 32 is mounted in a vertical orientation by two clamps 46,48. The lower one of the clamps 48 is connected to a housing 50 of the optical scanning assembly 28 and the upper one of the clamps 46 is connected to the mounting plate 26. Preferably, at least one of the clamps 46,48 is adjustable and permits one of the upper and lower portions of the laser 32 to be adjustable toward and away from the weld torch axis 42. Adjustment of both the adjustable clamp 46 and the adjustment sleeve 27 permit the orientation of the projection axis of the laser 32 to be precisely controlled for the purpose of accurate alignment.

As best shown in FIG. 2, the substantially non-diverging, monochromatic beam of light 60 generated by the laser 32 emerges from the lower end of the laser 32 and is reflected by a suitably oriented first prism 52. This prism 52 is positioned immediately below the laser output for directing the beam 60 along a perpendicular bisector of the optical scanning assembly central projection axis 44. A second prism 54 is positioned to receive the horizontal laser beam 60 and to reflect it in an upward direction, preferably colinear with the central projection axis 44. On the upward path, the beam 60 encounters means 56 for directing the beam 60 downwardly in a direction parallel to the central projection axis 44 and for causing the beam 60 to move in a closed loop path around and parallel to the central projection axis 44. Preferably, this means 56 includes a third prism 57 displaces the beam 60 radially away from the central projection axis 44 and redirects the beam 60 downwardly along a path parallel to the central projection axis 44 for producing a projected output beam 60 that rotates through a circular pattern in response to rotation of the first rotor body 58 about the central projection axis 44. Rotation and support of the first rotor body 58 is accommodated by bearings 62 and 64 within the housing 50. The speed and direction of rotation are established by a motor, preferably a precision stepper motor 66, driving a pulley 68 through a drive shaft 70. The pulley 68 is connected by a belt 71 to the first rotor body 58 for producing rotation of the first rotor body 58 and the third prism 57 attached thereto, and, hence, rotation of the projected beam 60. It is preferred that the belt 71 be toothed and the pulley 68 and rotor body 58 be adapted to mate with the profile of the belt 71 for avoiding the possibility of slippage.

From the foregoing, it can be appreciated that the laser 32, the prisms 52, 54 and 57, the rotor body 58 and the motor 66 constitute the major portions of the projection means 31 for delivering a rotating beam of light 60 onto the workpieces 14 and 16 in the area of the seam 12 for forming a spot 100, and for rotating this beam 60, and hence the spot 100, through a circular path intersecting the seam 12.

The use of a scan defining a closed loop, rather than a straight line, relative to the projection axis 44, is a significant advantage provided by this invention. This rotating scan renders the triangulation process, detailed subsequently, substantially omni-directional relative to a straight line scan. That is, the rotating scan renders the accuracy of the seam position determination less sensitive to the orientation of the seam relative to the optical scanning assembly 28 than would be the case with a scanning system utilizing a straight-line scan. This results from the fact that a closed loop will traverse a seam of changing orientation in a more nearly perpendicular transit than will a straight line.

It should be understood that the terms "vertical", "horizontal", "up", "down", etc., as used herein, are mere references to the drawings for purposes of convenience and are not intended to delimit the use of the apparatus to any particular spatial orientation.

As further shown in FIG. 2, the beam 60 is projected onto a surface 200 defined by the upper face of the workpieces 14 and 16 which varies in elevation between a top plane 200', representing the highest level of the workpieces 14,16 in FIG. 1, and a bottom plane 200, representing the lowest point of the seam 12. The diameter of the beam is preferably relatively small compared to the width of the seam 12, and may be on the order of 0.5 mm, for example. When the beam 60 strikes the workpiece 14,16, it is scattered from the spot 100 with reduced intensity in all directions.

As previously stated, the optical scanning assembly 28 further includes means 33 for receiving and focusing reflections of the laser spot 100. The image establishing means 33 includes a flat first mirror 72 mounted on and rotatable with the first rotor body 58 and being in radially spaced relationship to the central projection axis 44. The first mirror 72 receives a cone of diverging light reflected from the spot 100. This cone is symmetric about a reception axis 41,41' extending from the spot 100,100' to the center of the first mirror 72. The first mirror 72 is fixed in distance and orientation relative to the beam 60. Thus, the angle of the reception axis 41,41' relative to the central projection axis 44 is a function of the distance from the scanning assembly 28 to the respective one of the workpieces 14 and 16 along the laser beam 60.

The reflections from the laser spot 100 are reflected from the first mirror 72 and pass through a first converging lens 74 toward a second mirror 76. In common with the first mirror 72, the first lens 74 and the second mirror 76 each are mounted on the first rotor body 58 for rotation therewith. The first lens 74 has a focal length approximately equal to the length of the optical path extending from the reflective surface of the workpieces 14 and 16 to the lens 74. The first and second mirrors 72,76 serve to fold the optical axis of the reflections from the beam 60 substantially back onto the central projection axis 44.

The reflections of the laser beam 60 are reflected vertically from the second mirror 76 in an upward direction substantially along the central projection axis 44 where the reflections of the spot 100 encounter means 77 for derotating the reflections. This derotation means 77 includes a Dove prism 78 positioned along the central projection axis 44 and mounted within a second rotor body 80. The use of a Dove prism 78, in a manner hereinafter to be detailed, serves to cause derotation of the reflections from the spot 100. The second rotor body 80 is substantially cylindrical and is mounted on second rotor body bearings 84,86 which are positioned intermediate the first and second rotors 58,80 for permitting independent relative rotation therebetween. The second rotor 80 is driven by a belt 83 trained about a second pulley 82 which is mounted on the shaft 70.

The belt 83 and the second pulley 82 and the second rotor 80 should be toothed or otherwise adapted for engagement free from slippage. The various elements of the drive systems of the two rotors 58,80 are of a configuration sufficient to cause the two systems to rotate in synchronism and in the same direction, but with the second rotor body 80 rotating at precisely one-half the speed of the first rotor body 58. As will be recognized by those skilled in the art, this use of the Dove prism 78 results in derotation of the reflections of the circularly moving spot 100. While toothed belts and pulleys are utilized in the preferred embodiments of two drive systems, it will be appreciated that various other apparatus, for example, a geared drive system, could alternatively be utilized.

The derotated reflections exiting from the Dove prism 78 are directed through a narrow band wavelength filter 88 carried by the housing 50 at a position immediately above the second rotor body 80. The narrow wavelength band transmitted by the filter 88 is centered about the wavelength of the laser beam 60 established by the laser 32. Accordingly, the filter 88 serves to substantially eliminate the effects on the sensing, analyzing and controlling means 38 of light from the other sources, including the glare from the welding operation. The reflections from the spot 100, after passing through the filter 88, are directed through a two element converging lens 90 that is fixedly attached to the housing 50. The two element lens 90 has a focal length equal to the length of the optical path between itself and an optical sensor 94 of the sensing, analyzing and controlling means 38 for focusing the derotated image on the sensor 94. The sensor 94 preferably includes a 256-element linear photocell array 95 which operates as an optical-to-electrical signal converter. A suitable such 256-element array is manufactured by Reticon Corporation of Sunnyvale, Calif. and is identified as part number RL-256 EC/17.

The use of rotating optics is an advantageous feature of this embodiment of the present invention. Because the central projection axis 44 is maintained substantially centered over the seam 12 and since the first reflection receiving mirror 72 is positioned diametrically opposite to the projected laser beam 60, the optical viewing path along the reception axis 41 is substantially parallel to the longitudinal axis of the seam 12 during the time that the beam 60 is traversing the seam 12. This minimizes blockage of the optical path by the edges of the seam 12. Thus, the viewing geometry of the presently described embodiment is especially well suited for the welding of concave seams 12 which are typical to many welding situations.

Further, the present arrangement is advantageous relative to sensors in which the lines of laser projection and reception are substantially parallel. Spot reflections are maximum at an angle in the plane of, but opposite to, the angle of incidence. The intensity of the reflections decreases as the angle of reception deviates from being equal but opposite the angle of incidence. Thus, for a given angle of reception, the spot intensity will be greater for a vertically projected beam, as is the case in the present embodiment, than it would be for a beam projected substantially parallel to the angle of reception. This provides the present embodiment with a greater signal-to-noise ratio than would be the case for many other arrangements.

As indicated in FIG. 2, the reflected image beam is focused at a point on the two-dimensional photocell array 95. This point of focusing is dependent upon the instantaneous orientation of the reception axis 41 relative to the first mirror 72. Accordingly, the location of the element in the array 95, which is activated by the focused, reflected image, is a function of the distance from the optical scanning assembly 28 to the corresponding one of the workpieces 14 and 16, is measured along the laser beam 60. By electronically scanning the array 95 at a high repetition rate, and constantly comparing the output of the sensor 94 with the instantaneous position of the projected laser beam 60 in its closed loop path, digital data is generated which represents the profile of that portion of the workpieces 14,16 swept by the laser beam 60.

As previously indicated, in determining the profile of the surface swept by the beam 60, it is necessary to know the position of the projected beam 60 as a function of time. Toward this end, means 160 is provided for monitoring the position of the projected beam 60. Preferably this beam position monitoring means 160 includes a rotational position encoder 162 having a geared input shaft 164. A take-off gear 166 is mounted on the drive shaft 70 of the motor 66 and drivingly engages the rotational position encoder geared input shaft 164. The sizes of the gears 164,166 and the response of the position encoder 162 are preferably so selected that each point in the rotation of the first rotor body 58 yields a unique output from the encoder 162 that is precisely repeated from rotation to rotation.

As illustrated in FIG. 2, the optical scanning assembly 28 further comprises a glass prism support 96, that is planar and preferably non-distorting in character and fixedly mounted in the lower end of the housing 50 for providing rigid support for the second prism 54. Parallel to and spaced downwardly from the glass prism support 96 is a glass heat and smoke shield 98 that is also carried within the lower end of the housing 50. This smoke and heat shield 98 is preferably provided with seals adapted to maintain the interior of the scanning assembly 28 free from dust and smoke. A frustoconical light shield 34 is mounted at the lower end of the housing 50 and extends downwardly from the heat and smoke shield 98 and reduces the degree to which glare from the welding operation enters the optical scanning assembly 28. This light shield 34 also shields the heat and smoke shield 98 from spatter occurring during the welding operation.

FIG. 4 is a simplified representation of the light beam projecting and moving beans 31 of FIG. 2 and shows in perspective the nature and pattern of the light spot 100 which is projected onto the workpieces 14 and 16 in the area of the weld seam 12. The laser 32 generates a beam of light 60 which is directed at the second prism 54 mounted on the stationary prism support plate 96. For the sake of simplicity, the first prism 52 has not been represented in FIG. 4. The second prism 54 redirects the light beam to the rotating third prism 56 which, being rotated under the control of the stepper motor 66, causes the projected light beam 60 to produce a spot 100 which travels through a circular pattern. That the pattern of the spot 100 is circular results from the fact that the axis of rotation of the rotating prism 56 is colinear with the upward path taken by the laser beam 60 upon reflection from the second prism 54. Absent this colinearily, the path travelled by the spot 100 would be non-circular. The diameter of the circular pattern is preferably greater than the maximum expected weld seam width such that a 180° sweep of the projected beam 60 can extend fully across the weld seam 12. A diameter of about 2.3 cm has been found adequate for most applications. If the central optical axis 44 is maintained near the center of the seam 12 and if the diameter of the circular pattern is significantly greater than the width of the seam 12, the spot 100 will traverse the seam 12 substantially perpendicular thereto. This provides certain control advantages.

Attention is now directed to FIG. 5 which shows a diagrammatic representation of the photo-sensitive image sensing device 39. The image sensing device 39 includes a circuit 99 adapted for electrically scanning the photocell array 95 and for developing digital data representing the instantaneous vertical position of the spot 100. A compilation of the vertical positions of the spot 100 for various points along the circular spot path is used in generating a profile of the seam 12. The spot position monitoring circuit 99 includes a peak detector 126, an 8-bit counter 128, a latch 130, a D/A converter 132 and a scan circuit 134. The scan circuit 134 produces a serial chain of 256 analog voltage levels, each level being proportional to the intensity of light falling on the respective cell of the array 95. The peak voltage in this chain at a given instant corresponds to the instantaneous position of the spot 100. The peak detector 126 is a conventional circuit which may include a differentiator 136, negative peak detector 138, comparators 142 and 144, divider 140 and flip-flop 146. The peak detector 126 senses the peak voltage in the analog video signal chain and delivers a strobe pulse to the latch 130 in response to the peak voltage being sensed.

The scan circuit 134, which is conventional in design and is available from the Reticon Corporation, part number RC100/102, provides clock signals, a video out signal, and a start-of-scan signal that indicates the time at which the first cell of sensor array 95 is being read. The video out signal is transmitted to the peak detector 126. The clock and start-of-scan signals are delivered both to the photocell sensor 94 and to an 8-bit counter 128. The count accumulated in counter 128 corresponds to the number of cells of the sensor array 95 that have been read. Upon receipt of the strobe signal by latch 130, the count value in counter 128 is loaded into latch 130. Thus, the 8-bit binary value in latch 130 corresponds to the spot position on sensor array 95. The start-of-scan signal produced by the scan circuit 134 resets the counter 128 in preparation for the next scanning cycle.

The 8-bit binary output of the spot position monitoring circuit 99, that represents the spot position, is input directly into a data acquisition computer (not shown) for processing. This output can also be provided to a D/A converter 132 that produces an analog signal adapted for driving an optical display 92 for providing a visual indication of the seam profile.

The rate of rotation of the beam 60 is preferably dependent upon the weld rate (that is, the rate at which the weld torch 20 traverses the weld seam 12) such that the distance traversed by the weld torch 20 is constant during a single cycle of the optical scanning assembly 28. Preferably the rate of rotation of the beam 60 is such that the central scanning axis 44 moves about 0.5 cm per beam cycle. The number of points on the circular beam path that are sampled for position, these sampling points being referred to as "beta points", are preferably independent of the rate of beam rotation. There are preferably 640 beta points per cycle. In FIG. 6, short lines crossing the spot path are shown at every tenth beta point. The seam profile (FIG. 7) is generated by the data acquisition computer every 0.06 seconds (at a typical weld speed of 50 cm/minute) and consists of the relation between the spot elevation obtained from the image sensing device 39 and the position of the spot along the circular path.

Computerized numerical analysis is utilized to determine the seam configuration and position. As previously indicated, the information concerning the seam configuration (i.e., width, depth and cross-sectional area) is used in controlling the amount of weld wire 22 deposited per unit of seam length. The information detailing the seam center position is utilized in positioning the weld torch 20 and the optical scanning assembly 28 directly above the seam 12. FIG. 8 shows a flow chart of a data acquisition program suitable for use with the data acquisition computer 210 for obtaining the requisite seam configuration and position information.

In order to perform these calculations, it is necessary that the angle "A" between the X-axis of the weld frame (FIG. 1) and the centerline 43 extending in the horizontal plane between the weld torch axis 42 and the central projection axis 44 be known. Accordingly, means 150 is provided for monitoring the degree of rotation of the optical scanning assembly 28 relative to the nonrotatable weld torch support 21. The rotation determining means 150 preferably includes a rotational position encoder 152 having a geared shaft 154 drivingly engaged by a ring gear 156 fixed to the rotation sleeve 19.

At the commencement of the welding operation, the seam tracking and welding assembly 10 is positioned with the optical scanning assembly 28 above the initial portion of the seam 12. As will be detailed subsequently, the seam tracking and welding assembly 10 includes means for continuously monitoring the position of the weld torch 20 in a manner familiar to those skilled in the art. From the known weld torch location and from the output of the optical scanning assembly rotation monitoring means 150, which monitors angle "A", the X, Y, and Z coordinates of the central projection axis 44 are established by the data acquisition computer 210. Intermediate these two known points, a straight line interpolation is then performed for establishing five points intermediate the weld torch 20 and the central projection axis 44.

Upon activation of the assembly 10, the laser beam 60 commences its sweep. This sweep is divided into two portions for the purpose of the computerized analysis; the front pass, which is that half of the full revolution furthest from the weld torch 20, and, the back pass, which is the remainder of the full revolution. Initially, a point at the 90° mark in the spot path (SEE FIG. 6 showing this path, with the point on the path nearest the weld torch 20 being defined as the 0° start point) commences the front pass and a point at 270° terminates the front pass. As previously set forth, the position of the beam 60 is continuously monitored by the data acquisition computer 210 through use of the beam projection point monitoring means 160. The positional measure utilized is the angle B as measured from the 0° start point to the instantaneous position of the laser spot 100. Upon completion of the front pass, at which time the data acquisition computer 210 has received a measure of the seam profile by storing the set of spot elevations as a function of the angle B, the seam profile and location are calculated. Initially, the data is corrected for the curvature of the circular path and then the positions of the edges of the seam 12 are calculated. From this data the geometric center of the seam 12 is determined. Additionally, the average depth and the cross sectional area of the seam 12 are determined. These calculations are all performed on the back pass of the laser scan. As will be detailed subsequently, this information is utilized in subsequent weld torch positioning and in establishing the weld wire feed rate.

In addition to performing the measurements related to weld torch control, the optical scanning assembly 28 must, of course, also control its own operation. To this end, two determinations are effected by the data acquisition computer 210. First, there must be a determination of any correction that must be made in the orientation of central scanning axis 44 relative to the weld torch axis 42 for maintaining the central scanning axis 44 over the seam center. This is effected by analyzing the most recently obtained seam center positions. As it is important that the scanning assembly repositioning occur as rapidly as possible following the time the beam 60 has crossed the seam 12, the computations for the purpose of optical scanning assembly 28 repositioning are handled separately by the data acquisition computer 210. In one embodiment, the software includes a subroutine for permitting the optical scanning assembly 28 to recognize discontinuities of a preselected magnitude in the workpiece 12 profile. This allows the data acquisition computer 210 to immediately recognize the beta points at which the beam 60 crosses into and out of the seam 12. Upon recognition of the second transition beta point and while still in the front pass, these two beta points are averaged for yielding the beta point of the seam center. This quickly calculated seam center beta point is then converted to the equivalent Cartesian coordinates. This derived seam center point and the two previously calculated seam center positions are utilized in the generation of a best-fit straight line approximating the seam center line. The requisite change in angle "A" is then calculated and effected to position the central scanning axis 44 immediately above this center line prior to the commencement of the next front pass.

The second determination which must be made for controlling the optical scanning assembly 28 concerns the point at which the front pass is commenced. It is desirable to maintain the front pass centered on the anticipated position of the seam 12 at the point at which the front pass will cross the seam 12; that is, the front pass should commence at a point such that the projected next seam center will intersect the laser scan path at a half-way point in the front pass. This ensures that the maximum latitude for significant changes in seam 12 position can be accommodated by the optical scanning assembly 28. The data acquisition computer 210 effects this determination of the beta point at which the front pass should commence by calculating the beta point at which the next seam center is expected to occur and subtracting from it one-quarter of the total number of beta points.

FIG. 8 provides a basic flow chart of software suitable for the control of the data acquisition computer 210. The program may include various subroutines to increase calculation accuracy and to correct edge glitches in readings when the spot 100 scans across seams having machined edges. For example, increased accuracy in detecting seam edges can be achieved by averaging five seam points on each side of the seam to determine base levels; the edges can then be found by determining which seam samples exceed the base levels by a preselected threshold amount. Similarly, improved weld fill accuracy can be obtained using a subroutine which averages the seam points between the seam edges to determine the average seam depth.

Industrial Applicability

Referring now to FIG. 3, the apparatus of FIGS. 1 and 2 is incorporated into an automatic welding system in which a FCAW weld torch 20 is caused to follow a weld seam 12, such as the groove intermediate the two workpieces 14 and 16, and in which the welding wire feed rate is varied to fill the weld seam 12 to an optimum degree. The system of FIG. 3 defines a Cartesian coordinate system having mutually orthogonal X, Y and Z axes.

The automatic seam tracking and welding apparatus 10 of FIG. 3 is shown to comprise spaced parallel rails 102 and 104, the orientation of which defines the X axis of the Cartesian coordinate system. Rails 102 and 104 are spaced a fixed distance above a ground level and are held in position by means of support columns or stanchions 106 and are spaced sufficient distance apart to provide a substantial work area. A cross beam 108 is mounted on a pair of trolleys 110 and 112 for movement along the rails 102 and 104 in both positive and negative directions along the X axis. A carriage 114 is mounted on the cross beam 108 for allowing movement along the Y axis. The carriage 114 has mounted thereon a support 116 adapted for carrying a weld wire supply reel 118. A Z axis rack and pinion support tower 120 is also carried by the carriage 114 for bidirectional vertical movement of the platform 18 for regulating the welding arc length and for accommodating varying elevational positions of the seam 12. Wire 22 from the supply reel 118 is trained around an idler pulley 122 and is directed downwardly to the weld torch 20 substantially along the weld torch axis 42.

As will be apparent to those skilled in the art, the two trolleys 110 and 112, the carriage 114 and the rack and pinion support tower 120 include the requisite motors and mechanical drives (not shown) for providing three-axis (X,Y,Z) positionability of the weld torch 20. These elements constitute means 101 for moving the weld torch 20, and, hence, the cylindrical sleeve structure 19 including the optical scanning assembly 28, in response to control signals through suitable increments along the X, Y and Z axes for positioning the weld torch 20 at a preselected elevation precisely over the weld seam 12. This positioning of the weld torch 20 is performed by a weld torch control computer 91 in accordance with information concerning the upper profile of the workpieces 14 and 16 which is provided by the tracking means 28,38. The weld torch control computer 91 is housed in a stationary control panel 93. This control panel 93 also contains the data acquisition computer 210. A cable 124 connects the control panel 93 to the image sensing device 39 and to the various motors of the weld torch moving means 101 and the wire feed motor 25.

As previously detailed, a wrist motion motor 40 is controlled, as necessary, by the data acquisition computer 210 for swinging the central projection axis 44 relative to the weld torch axis 42 for accommodating curves or corners in the weld seam track, i.e., since the projector central projection axis 44 leads the weld torch axis 42, wrist motion is employed as a fourth degree of translational freedom for allowing the central projection axis 44 to be maintained precisely positioned over the center of the weld seam 12 while leaving the coordinate position of the weld torch 20 unaffected. Hence, both the weld torch 20 and the optical scanning assembly 28 are simultaneously maintained above the weld seam 12, irrespective of the configuration of the weld seam 12.

Figure 9A:
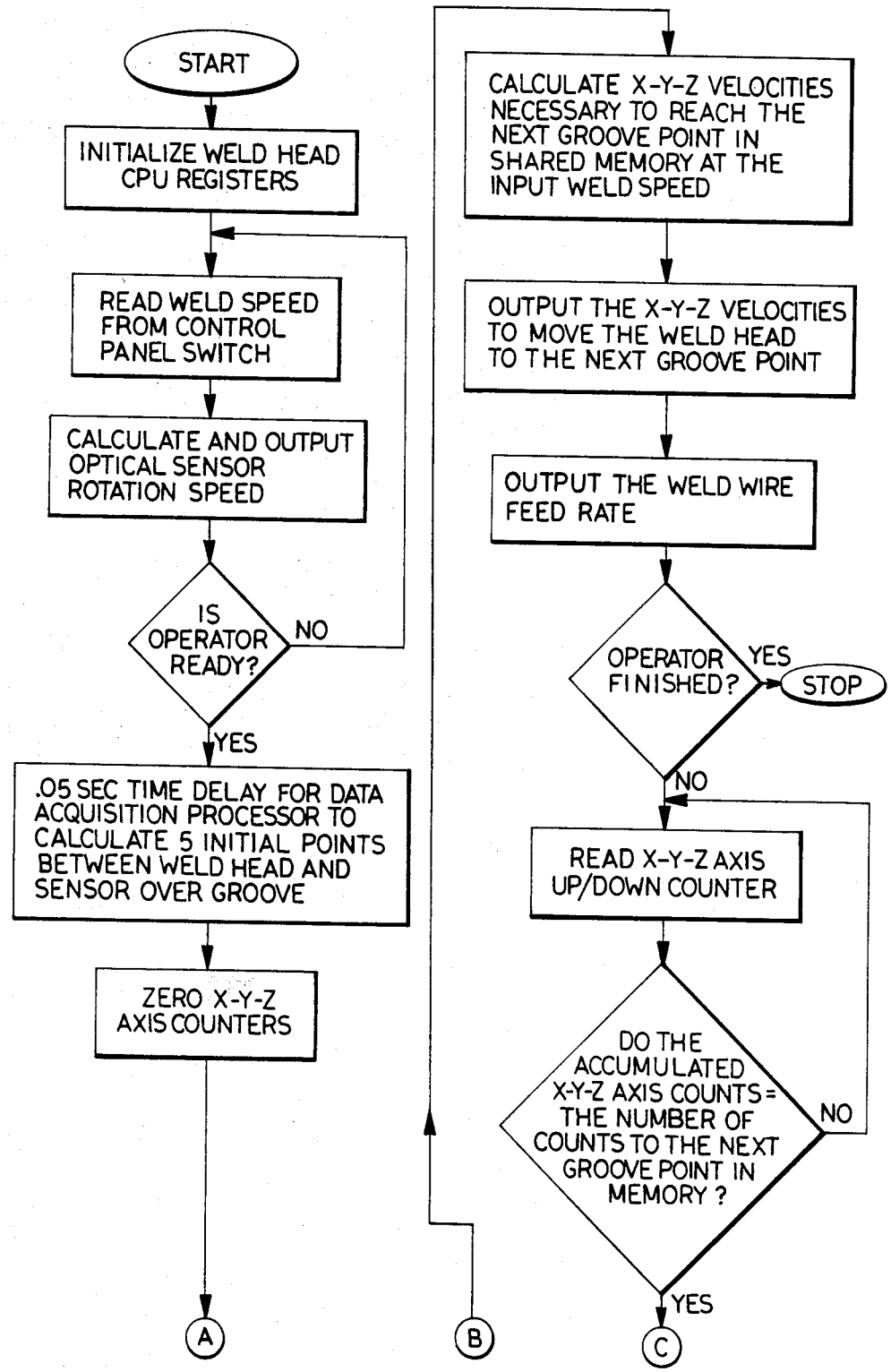

The various motors and mechanical drives for moving the trolleys 110 and 112 and the carriage 114 for properly positioning the weld torch 20 (that is, the weld torch moving means 101) form a portion of a three-axis numerical control system, the details of which are well known in the art. This system is controlled by a weld torch control computer 91 receiving inputs from the data acquisition computer 210 which analyzes the data to determine the seam profile, as set forth previously; the weld torch control computer 91 serving to generate control signals for moving the weld torch 20 in a seam following manner. This system includes means for continuously monitoring the X, Y, and Z coordinates of the weld torch 20. A flow chart of a typical computer program for use with the weld torch control computer 91 for producing the control sequence is shown in FIGS. 9a and 9b. As is apparent from this flow chart, data is first input to the weld torch control computer 91 regarding the desired speed of the weld torch 20 relative to the workpiece as well as the rotational speed of the beam 60. By linear interpolation, five initial points between the weld torch 20 and the spot pattern are calculated by the data acquisition computer 210. Subsequently, calculations are made by the weld torch control computer 91 of the velocities in the X, Y and Z axis directions which are required to move the weld torch 20 between these interpolated points. The velocities are continually updated in response to monitoring of the current weld torch position and are translated to signals for controlling the movement of the weld torch 20 by the three-axis numerical control system 91,101.

Those skilled in the art will recognize that in place of a separate data acquisition computer 210 and weld torch control computer 91, a single computer can be utilized. One advantage of using separate computers for analyzing the weld seam information and for effecting the requisite motion of the weld torch is that this permits the system to include the use of a commercially available non-adaptive 3-axis weld torch control system.

Once the workpieces 14 and 16 are properly positioned beneath the weld torch 20 and within the framework of the system, as shown in FIG. 5, the laser 32 is actuated for generating the spot of light and the motor 66 is actuated to cause the projected spot of light to rotate through a circular pattern, as shown in FIG. 3. As the circular pattern encounters the weld seam 12, the angle of the reception axis 41 relative to the central projection axis 44 is a function of the elevation of the location at which the laser beam 60 strikes the workpieces 14 and 16. This causes the derotated image striking the photocell array 95 to move linearly along the photocell array 95 in response to changes in the relative angle of the reception axis 41 so that the position of the light spot on the array 95 is a function of the distance from the optical scanning assembly 28 to the spot 100 formed on the workpieces 12,14 by the laser beam 60. Thus, a form of triangulation is utilized in determining the elevation of the workpiece 14,16 at each beta point. The seam profile data can be established by appropriate electronics and software, as previously detailed, by comparing, for a beam half cycle, the calculated spot 100 Z coordinate to the corresponding X-Y coordinate of the projected beam 60.

The weld torch control processor 91 and the data acquisition processor 210 share a common memory. A portion of this memory is dedicated to storage of the seam center positions as provided by the data acquisition computer 210. The seam centers are sequentially stored for subsequent use in controlling the weld torch 20. As previously stated, five initial artificial seam center positions are calculated through interpolation between the first calculated seam center and the initial weld torch position. From the first of these points, that nearest the weld torch 20, a calculation is made of the X, Y, and Z axis velocities required to reach this first point while moving at the input weld speed. Counters track changes in the X, Y, and Z positions of the weld torch 20 subsequent to having been zeroed at the last seam center to be reached. The counters are repeatedly compared to the next stored groove center and in response to the X, Y, and Z counters equalling the next stored groove center, it is known that the weld torch 20 has reached its target location. At this point the value of each of the X, Y, and Z counters is subtracted from each stored seam center and the counters are again zeroed. Thus, upon reaching a known seam center all subsequent seam centers are referenced to a new Cartesian system having the weld torch 20 as its center. During this updating of the stored seam centers, input to the seam center memory from the data acquisition processor 210 is disallowed. This ensures uniformity of Cartesian reference of the most recently calculated seam center. Following the seam center update, a new groove center point is entered from the memory and the process is repeated. Following the initial operation period, approximately 20 seam centers relating to that portion of the seam from the weld torch 20 to the optical scanning assembly 28, are retained in the memory.

The weld torch 20 is therefore moved between adjacent seam centers in a straight line. However, since the average optical scanning assembly 28 motion is about 0.5 cm from cycle to cycle, this straight line point-to-point motion of the weld torch 20 reflects the position of the actual seam center to a very good approximation. Increased precision can further be obtained by increasing the cycle rate of the optical scanning assembly 28 relative to the weld torch speed or by utilizing a curve fit to establish the best curve fitting the observed seam centers and subsequently positioning the weld torch 20 along this curve rather than from point to point.

As an alternative to the use of the Dove prism 78 and multiple rotor structure shown in FIG. 2 for derotation of the rotating spot, one can utilize a two-dimensional photocell array, for example, a 256×256 array, and to devise a program for derotating the signal by computer. However, the one-dimensional array system disclosed herein has been found to provide greater resolution with significantly less signal processing time when compared to a two-dimensional array.

As known by those skilled in the art, the sensing, analyzing and controlling means 38 could analyze the full path traced by the laser beam 60 rather than analyzing only the front pass. This would require a restructuring of the computation-allotted processor time. This could be achieved through the use of a single, sufficiently fast computer utilizing interrupt algorithms for switching between receipt of the outputs from the image sensing 39 and angle B monitoring 160 devices and computation of the Cartesian coordinates at each beta point. Alternatively tandem computers for the front and back pass could be utilized.

This dual-look, once on each front pass and once on each back pass, is advantageous from two standpoints. First, it permits double the number of seam center positions to be determined. This improves the resolution of the system and minimizes the effects of errors, especially if the results of a front pass and the corresponding back pass (that is, the back pass nearest in position to the front pass at the point the seam center occurs) are averaged. Second, and very importantly, a near-simultaneous look at two separated points on the seam 12 allows for greatly improved error analysis. For example, where a sudden disappearance of the seam 12 is noted on the front pass, absence of the seam 12 on the back pass (where it had previously been detected on approximately the third previous front pass) indicates a fault in the sensing, analyzing and controlling means; whereas non-detection of the seam 12 on the front pass followed by detection on the immediately following back pass indicates that the seam 12 has ended.

Other aspects, objects, advantages and uses of this invention can be obtained from a study of the drawings, the disclosure, and the appended claims.

I claim:

1. In a welding system (10) having a weld torch (20), a weld torch axis (42), a weld torch support assembly (21), means (28,38) for tracking and analyzing a weld path (12) of a workpiece (14,16) to which weld material (17) is to be applied, and means (101) for moving said weld torch support assembly (21) along said weld path (12) in response to signals generated by said tracking means (28,38), the improvement comprising:

said tracking and analyzing means (28, 38) including a workpiece scanning assembly (28) connected to said weld torch support assembly (21), said workpiece scanning assembly (28) including, means (31) for projecting a beam of light (60) against said workpiece (14,16) and for moving said beam of light (60) in a closed path about an optical scanning axis (44) of fixed orientation parallel to and spaced apart from said weld torch axis (42);

means (33) for receiving and focusing reflections from said workpiece (14,16) of said beam of light (60), means (19,40) for pivoting said scanning assembly (28) relative to said weld torch support assembly (21); and, said tracking and analyzing means (28,38) further including means (38) for sensing and analyzing the focused reflections and controlling the position of said workpiece scanning assembly (28) in response to data obtained from the analysis of the focused reflections.

2. The welding system (10), as set forth in claim 1, wherein said pivoting means (19,40) is adapted for pivoting of said canning assembly (28) about an axis substantially parallel to said optical scanning axis (44).

3. The welding system (10), as set forth in claim 2, wherein said reflection receiving means (33) receives said reflections about an optical reception axis (41) oblique to said optical scanning axis (44).

4. The welding system (10), as set forth in claim 3, wherein said light beam (60) is substantially monochromatic and non-diverging.

5. The welding system (10), as set forth in claim 1, wherein said sensing, analyzing and controlling means

(38) determines the position of the center of said weld path (12) at a location on the path of the light beam (60).

6. The welding system (10), as set forth in claim 5, wherein said sensing, analyzing and controlling means (38) develops data relative to the cross-sectional area of said weld path (12).

7. The welding system (10), as set forth in claim 5, wherein said sensing, analyzing and controlling means (38) controls said scanning assembly pivoting means (19,40) in response to the determined weld path center.

8. The welding system (10), as set forth in claim 7, wherein said sensing, analyzing and controlling means (38) maintains said scanning assembly (28) substantially over said area (12) to which weld material (17) is to be applied.

9. The welding system (10), as set forth in claim 7, wherein said sensing, analyzing and controlling means (38) maintains said optical scanning assembly (28) with said optical scanning axis (44) intersecting said weld path (12) to which weld material (17) is to be applied.

10. The welding system (10), as set forth in claim 1, wherein said projected beam (60) is moved and traverses a straight line path relative to said optical scanning axis (44).

11. The welding system (10), as set forth in claim 1, wherein said projected beam (60) is moved and traverses a closed loop path relative to said optical scanning axis (44).

12. The welding system (10), as set forth in claim 11, wherein said closed loop path is circular and is centered about said optical scanning axis (44).

13. The welding system (10), as set forth in claim 12, including means (77) for generating a derotated optical image from said reflections from said workpiece (14,16).

14. The welding system (10), as set forth in claim 11, wherein said sensing, analyzing and controlling means (38) determines the position of the center of the weld path (12) at a position on the path of the light beam (60).

15. The welding system (10), as set forth in claim 14, wherein said sensing, analyzing and controlling means (38) develops data relative to the cross-sectional area of said weld path (12).

16. The welding system (10), as set forth in claim 14, wherein said sensing, analyzing and controlling means (38) controls said scanning assembly pivoting means (19,40) in response to the determined weld path center.

17. The welding system (10), as set forth in claim 16, wherein said sensing, analyzing and controlling means (38) maintains said scanning assembly (28) substantially over said area (12) to which weld material (17) is to be applied.

18. The welding system (10), as set forth in claim 16, wherein said sensing, analyzing and controlling means (38) maintains said optical scanning assembly (28) with said optical scanning axis (44) intersecting said weld path (12) to which weld material (17) is to be applied.

19. The welding system (10), as set forth in claim 11, further including means (77) for providing an optical image from said reflections from said workpiece (14,16) of said beam of light (60), the position of said image being dependent substantially solely on the instantaneous distance from said optical scanning assembly (28) to said workpiece (14,16) as measured along said projected beam (60).

20. The welding system (10), as set forth in claim 11, further including means (77) for rendering the position of said focused reflections independent of motion of the beam (60).

21. The welding system (10), as set forth in claim 1, wherein said closed path defined by said motion of said projected beam of light (60) twice traverses said weld path (12) to which weld material (17) is to be deposited, defines a front pass across said path (12) and a back pass across said path (12), said back pass being nearest said weld torch (20) as measured along said path (12), both of said front and back passes crossing said path (12) at respective locations advanced from the deposit of said weld material (17) along said path (12).

22. The welding system (10), as set forth in claim 21, wherein said tracking and analyzing means (38) derives in a single loop cycle of the projected beam (60) the position of the path (12) to which weld material is to be applied for both the front and back pass.

23. The welding system (10), as set forth in claim 1, wherein said projecting means (31) includes a light source (32) and means (56) for optically moving said beam of light (60) about said axis (44), said light source (32) being free from motion relative to said moving means (56); and, said receiving and focusing means (33) includes a sensor (94) and means (77) for optically rendering the position of said focused reflections on said seonsor (94) independent of the motion of said beam of light (60), said sensor (94) being free from motion relative to said optical rendering means (77) and said light source (32) and said sensor (94) being in a fixed relationship one to the other.

24. The welding system (10), as set forth in claim 1, wherein said scanning assembly (28) includes, a housing (50);

a motor (66) mounted to said housing (50); and, a first rotor body (58) rotatably connected to said housing (50) and adapted to rotate in response to said motor (66), said first rotor body (58) having a rotational axis coincident with said optical scanning axis (44);

and said projection means (31) includes, a second prism (54) mounted to said housing (50) and having a first face angularly intersecting said optical scanning axis (44); and, a third prism (57) mounted to said first rotor body (58), said third prism (57) having a first face angularly intersecting said optical scanning axis (44) and forming a right angle with said second prism first face, and a second face spaced apart from said optical scanning axis (44) and forming a right angle with said third prism first face.

25. The welding system (10), as set forth in claim 24, wherein said receiving and focusing means (33) includes, a first mirror (72) mounted to said first rotor body (58) and being radially spaced apart from said optical scanning axis (44);

a second mirror (76) mounted to said first rotor body (58) radially inwardly from and facing said first mirror (72) along said optical scanning axis (44);

a first converging lens (74) mounted to said first rotor body (58) intermediate said first and second mirrors (72,76);

a second rotor body (80) rotatably connected to said first rotor body (58) and adapted to rotate in response to said motor (66), said second rotor body (80) having a rotational axis coincident with said optical scanning axis (44);

an optical sensor (94) mounted to said housing (50) intersecting and perpendicular to said optical scanning axis (44);

a Dove prism (78) mounted to said second rotor body (80) along said optical scanning axis (44) intermediate said second mirror (76) and said sensor (94);

an optical filter (88) mounted to said housing (50) along said optical scanning axis (44) intermediate said Dove prism (78) and said sensor (94); and, a second converging lens (90) mounted to said housing (50) along said optical scanning axis (44) intermediate said filter (88) and said sensor (94).

26. The welding system (10), as set forth in claim 1, wherein said sensing and analyzing means (38) includes, an optical sensor (94); and, circuit means (99) for eleectronically scanning said sensor (94) a predetermined plurality of times during each closed path cycle of said beam of light (60).

27. The welding system (10), as set forth in claim 26, including, a digital counter (128) having an input connected to said optical sensor (94), and an output;

a scan circuit (134) connected to said sensor (94) and said counter (128);

a peak detector (126) having an input connected to said scan circuit (134), and an output; and, a latch (130) having respective inputs connected to said counter output and said peak detector output.

28. A method for sensing a groove in a workpiece, comprising the steps of:

projecting a beam of light along a first reference axis to a focus spot on said workpiece;

moving said spot through a closed loop path substantially normally intersecting said groove;

receiving a reflected image of said spot along a second reference axis angularly displaced from said first reference axis and at a location spaced from said spot;

focusing said reflected image of said spot on a linear optical sensor;

scanning said sensor electronically a predetermined plurality of times during each closed path cycle of said spot;

producing a first electrical signal in response to the position of said spot on said sensor;

producing a second electrical signal in response to the angular position of said spot along said closed loop path;

comparing said first and second electrical signals; and, producing an electrical signal representing the distance between said spot and said sensor at a plurality of locations along said path.

29. A method as set forth in claim 28, wherein said moving step includes the step of rotating said beam around a third reference axis parallel to said first reference axis at a first preselected rotational speed and wherein said receiving step includes the step of derotating said reflected image.

30. A method as set forth in claim 29, wherein said derotating step includes the steps of directing said reflected image through an optical dove prism and rotating said dove prism around said third reference axis at a second rotational speed, said second rotational speed being less in magnitude than said first rotational speed.

31. A method as set forth in claim 30, wherein said receiving step includes the step of substantially blocking light waves other than those reflected from said spot and originating from said beam.

32. A method as set forth in claim 29, wherein said receiving step includes the step of directing said reflected image from said area along said third reference axis.

33. The method, as set forth in claim 28, further including the step of moving the center of the closed loop in response to changes in position of the groove and maintaining said center of the closed loop substantially above said groove.

* * * * *